(12) United States Patent
Egorov et al.

(10) Patent No.: US 9,640,838 B2
(45) Date of Patent: May 2, 2017

(54) ORGANIC ELECTROLYTE SOLUTION INCLUDING THIOPHENE-BASED COMPOUND AND NITRILE-BASED COMPOUND AND LITHIUM BATTERY COMPRISING THE SAME

(71) Applicant: Samsung SDI Co., Ltd., Yongin-si, Gyeonggi-do (KR)

(72) Inventors: Vladimir Egorov, Yongin-si (KR); Woo-Cheol Shin, Yongin-si (KR); Jung-Yi Yu, Yongin-si (KR); Sang-Il Han, Yongin-si (KR); Sang-Hoon Kim, Yongin-si (KR); Duck-Hyun Kim, Yongin-si (KR); Myung-Hwan Jeong, Yongin-si (KR); Seung-Tae Lee, Yongin-si (KR); Tae-Hyun Bae, Yongin-si (KR); Mi-Hyun Lee, Yongin-si (KR); Eon-Mi Lee, Yongin-si (KR); Ha-Rim Lee, Yongin-si (KR); Moon-Sung Kim, Yongin-si (KR); In-Haeng Cho, Yongin-si (KR); E-Rang Cho, Yongin-si (KR); Dong-Myung Choi, Yongin-si (KR); Makhmut Khasanov, Yongin-si (KR); Pavel Alexandrovich Shatunov, Yongin-si (KR); Alexey Tereshchenko, Yongin-si (KR); Denis Chernyshov, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 196 days.

(21) Appl. No.: 14/143,533

(22) Filed: Dec. 30, 2013

(65) Prior Publication Data

US 2014/0342242 A1 Nov. 20, 2014

(30) Foreign Application Priority Data

May 15, 2013 (KR) ........................ 10-2013-0055280

(51) Int. Cl.
*H01M 10/052* (2010.01)
*H01M 10/0567* (2010.01)
(Continued)

(52) U.S. Cl.
CPC ..... *H01M 10/0567* (2013.01); *H01M 10/052* (2013.01); *H01M 10/0568* (2013.01);
(Continued)

(58) Field of Classification Search
CPC ......... H01M 10/0567; H01M 10/0562; H01M 10/0569; H01M 10/0568
(Continued)

(56) References Cited

U.S. PATENT DOCUMENTS

2004/0053138 A1 3/2004 Otterstedt et al.
2005/0208371 A1 9/2005 Kim et al.
(Continued)

FOREIGN PATENT DOCUMENTS

KR 10-2004-0024842 A 3/2004
KR 10-2011-0025622 A 3/2011

OTHER PUBLICATIONS

Korean Office Action dated Sep. 22, 2016 for Korean Patent Application No. KR 10-2013-0055280.

*Primary Examiner* — Sean P Cullen
(74) *Attorney, Agent, or Firm* — Knobbe Martens Olson & Bear LLP

(57) ABSTRACT

An organic electrolyte solution and a lithium battery using the same are disclosed. The organic electrolyte solution includes a lithium salt, an organic solution, a thiophene-based compound and a nitrile-based compound.

8 Claims, 8 Drawing Sheets

(51) Int. Cl.
*H01M 10/0568* (2010.01)
*H01M 10/0569* (2010.01)

(52) U.S. Cl.
CPC .. *H01M 10/0569* (2013.01); *H01M 2300/004* (2013.01); *H01M 2300/0028* (2013.01)

(58) Field of Classification Search
USPC ................ 429/332, 188, 326, 327, 339, 340
See application file for complete search history.

(56) References Cited

U.S. PATENT DOCUMENTS

| | | |
|---|---|---|
| 2008/0020287 A1 | 1/2008 | Cho et al. |
| 2010/0293779 A1 | 11/2010 | Kim et al. |
| 2011/0059356 A1* | 3/2011 | Ogasawara ........... H01M 4/366 429/188 |
| 2011/0207000 A1 | 8/2011 | Jow et al. |
| 2011/0229770 A1 | 9/2011 | Yun et al. |
| 2011/0311864 A1 | 12/2011 | Yamada et al. |
| 2012/0009486 A1* | 1/2012 | Hayakawa ........... H01M 4/133 429/336 |
| 2013/0101893 A1* | 4/2013 | Dai ................... H01M 10/0565 429/163 |

* cited by examiner

ORGANIC ELECTROLYTE SOLUTION INCLUDING THIOPHENE-BASED COMPOUND AND NITRILE-BASED COMPOUND AND LITHIUM BATTERY COMPRISING THE SAME

INCORPORATION BY REFERENCE TO ANY PRIORITY APPLICATIONS

Any and all applications for which all foreign or domestic priority claim is identified in the Application Data Sheet as filed with the present application are hereby incorporated by reference under 37 CFR 1.57. For example, this application claims the benefit of Korean Patent Application No. 10-2013-0055280, filed on May 15, 2013, in the Korean Intellectual Property Office, the disclosure of which is incorporated herein in its entirety by reference.

BACKGROUND

Field

The disclosed technology relates to an organic electrolyte solution and lithium batteries using the same.

Description of the Related Technology

Lithium batteries can be used as driving power source for portable electronic devices such as video cameras, mobile phones, notebook computers, etc. Rechargeable lithium secondary batteries have at least 3 times higher energy density per unit weight than those of the conventional lead storage batteries, Ni—Cd batteries, Ni metal hydride (Ni-MH) batteries, Ni—Zn batteries and the like. In addition, the lithium batteries can be charged at high speed.

Since lithium batteries are operated at high voltage, they are not compatible with an aqueous electrolyte, which is highly reactive to lithium. Lithium batteries mostly use an organic electrolyte solution. An organic electrolyte solution is prepared by dissolving a lithium salt in an organic solvent. A suitable organic solution must be stable at high voltage, and have a high ion conductivity and dielectric constant, and also have a low viscosity.

When a carbonate-based polar non-aqueous solvent is used in lithium batteries, an irreversible reaction between the electrolyte solution and the positive or negative electrode may occur during an initial charging process, causing excess consumption of charges The irreversible side reaction leads to formation of a protection layer on the surface of a negative electrode. The protection layer prevents decomposition of an electrolyte solution during charging and discharging and also serves as an ion tunnel. A higher stability and a lower resistance of the protection layer can increase the life cycle of the lithium batteries, and also their stability while preventing change in volume. Therefore, there is a need for the development of an organic electrolyte solution which can form a protective layer with improved stability and low resistance.

SUMMARY OF CERTAIN INVENTIVE ASPECTS

An aspect of the disclosed technology provides an organic electrolyte solution comprising:
a lithium salt;
an organic solution;
a thiophene-based compound represented by Formula 1

<Formula 1>

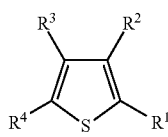

Wherein:

$R^1$, R, $R^3$ and $R^4$ are each independently a nonpolar functional group, or a polar functional group including a hetero atom of Group 13 to Group 16 of the periodic table of the elements, and at least one of $R^1$, $R^2$, $R^3$ and $R^4$ are a —CN group; and a nitrile-based compound represented by Formula 2;

NC—X—CN            <Formula 2> wherein X is a substituted or unsubstituted linear or branched $C_1$-$C_{20}$ alkylene group, and wherein the substituted group of the alkylene group is a nonpolar functional group or a polar functional group including a hetero atom of Group 13 to Group 16 of the periodic table of the elements.

In some embodiments, the polar functional group comprises at least one hetero-atom of O, N, P, S, Si, and B.

In some embodiments, the polar functional group is selected from of —F, —Cl, —Br, —I, —CN, —$R^9$CN, —C(=O)O$R^{10}$, —OC(=O)$R^{10}$, —O$R^{10}$, —OC(=O)O$R^{10}$, —$R^9$OC(=O)O$R^{10}$, —C(O)$R^{10}$, —$R^9$C(=O)$R^{10}$, —OC(=O)$R^{10}$, —$R^9$OC(=O)$R^{10}$, —($R^9$O)$_k$—O$R^{10}$, —(O$R^9$)$_k$—O$R^{10}$, —C(=O)—O—C(=O)$R^{10}$, —$R^9$C(=O)—O—C(=O)$R^{10}$, —S$R^{10}$, —$R^9$S$R^{10}$, —SS$R^{10}$, —$R^9$SS$R^{10}$, —S(=O)$R^{10}$, —$R^9$S(=O)$R^{10}$, —$R^9$C(=S)$R^{10}$, —$R^9$C(=S)S$R^{10}$, —$R^9$SO$_3$$R^{10}$, —SO$_3$$R^{10}$, —NNC(=S)$R^{10}$, —$R^9$NNC(=S)$R^{10}$, —$R^9$N=C=S, —NCO, —$R^9$NCO, —NO$_2$, —$R^9$NO$_2$,

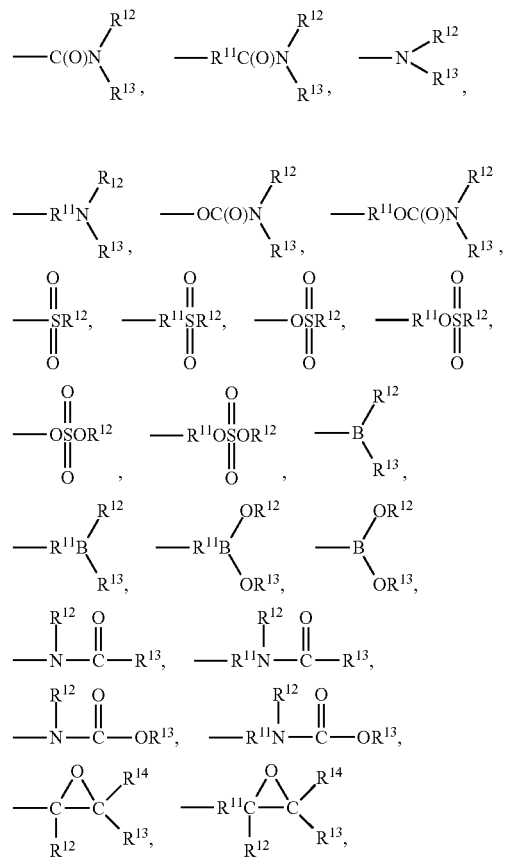

-continued

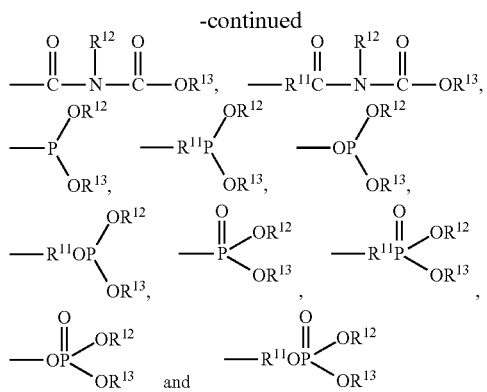

wherein:

R$^9$ and R$^{11}$ are each independently a C$_1$-C$_{20}$ alkylene group unsubstituted or substituted with a halogen atom or a cyano group, a C$_2$-C$_{20}$ alkenylene group unsubstituted or substituted with a halogen atom or a cyano group, a C$_2$-C$_{20}$ alkynylene group unsubstituted or substituted with a halogen atom or a cyano group, a C$_3$-C$_{12}$ cycloalkenylene group unsubstituted or substituted with a halogen atom or a cyano group, a C$_6$-C$_{40}$ arylene group unsubstituted or substituted with a halogen atom or a cyano group, a C$_2$-C$_{40}$ heteroarylene group unsubstituted or substituted with a halogen atom or a cyano group, a C$_7$-C$_{15}$ alkylarylene group unsubstituted or substituted with a halogen atom or a cyano group, a C$_7$-C$_{15}$ aralkylene group unsubstituted or substituted with a halogen atom or a cyano group;

R$^{10}$, R$^{12}$ and R$^{13}$ are each independently a hydrogen atom, a halogen atom, a C$_1$-C$_{20}$ alkyl group unsubstituted or substituted with a halogen atom or a cyano group, a C$_2$-C$_{20}$ alkenyl group unsubstituted or substituted with a halogen atom or a cyano group, a C$_2$-C$_{20}$ alkynyl group unsubstituted or substituted with a halogen atom or a cyano group, a C$_3$-C$_{12}$ cycloalkyl group unsubstituted or substituted with a halogen atom or a cyano group, a C$_6$-C$_{40}$ aryl group unsubstituted or substituted with a halogen atom or a cyano group, a C$_2$-C$_{40}$ heteroaryl group unsubstituted or substituted with a halogen atom or a cyano group, a C$_7$-C$_{15}$ alkylaryl group unsubstituted or substituted with a halogen atom or a cyano group, or a C$_7$-C$_{15}$ aralkyl group unsubstituted or substituted with a halogen atom or a cyano group; and k is an integer between 1 and 20.

In some embodiments, in a lithium battery comprising the organic electrolyte solution, wherein the polar functional group is selected from the group consisting of —F, —Cl, —Br, —I, —CN, —R$^{14}$CN, —NCO, —R$^{14}$—NCO, —NO$_2$, —R$^{14}$NO$_2$, —C(=O)OR$^{15}$, —OC(=O)R$^{15}$, —OR$^{15}$, —OC(=O)OR$^{15}$, —R$^{14}$OC(O)OR$^{15}$, —C(=O)R$^{15}$, —R$^{14}$C(=O)R$^{15}$, —OC(=O)R$^{15}$, —R$^{14}$OC(=O)R$^{15}$, —(R$^{14}$O)$_k$—OR$^{15}$, —(OR$^{14}$)$_k$—OR$^{15}$, —C(=O)—O—C(=O)R$^{15}$ and —R$^{14}$C(=O)—O—C(=O)R$^{15}$, Wherein:

R$^{14}$ is a C$_1$-C$_{10}$ alkylene group unsubstituted or substituted with a halogen atom or a cyano group, R$^{15}$ is a hydrogen atom, a halogen atom, or a C$_1$-C$_{10}$ alkylene group unsubstituted or substituted with a halogen atom or a cyano group, and k is an integer between 1 and 20.

In some embodiments, the thiophene-based compound is represented by Formula 3:

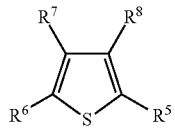

<Formula 3> wherein R$^5$, R$^6$, R$^7$ and R$^8$ are each independently a hydrogen atom, a halogen atom, or a C$_1$-C$_{10}$ alkyl group unsubstituted or substituted with a halogen atom or a cyano group; and at least one of R$^5$, R$^6$, R$^7$ and R$^8$ is a —CN group.

In some embodiments, the nitrile-based compound is represented by Formula 4

NC—[C(R$^{16}$)(R$^{17}$)]$_n$—CN <Formula 4>

Wherein:

R$^{16}$ and R$^{17}$ are each independently a hydrogen atom, a halogen atom, —CN, a C$_1$-C$_{10}$ alkyl group unsubstituted or substituted with a halogen atom or a cyano group, or a C$_2$-C$_{10}$ alkenyl group unsubstituted or substituted with a halogen atom or a cyano group;

at least one of R$^{16}$ and R$^{17}$ is —CN; and n is an integer between 1 and 16.

In some embodiments, the thiophene-based compound is

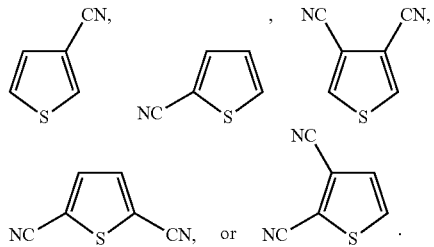

In some embodiments, the nitrile-based compound is

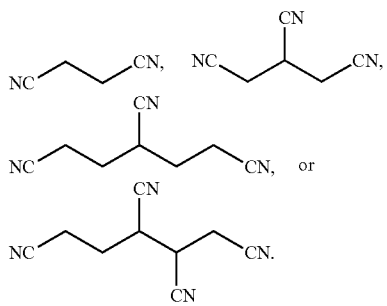

In some embodiments, the thiophene-based compound is present in an amount from about 0.001 to about 5 wt % based on total weight of the organic electrolyte solution.

In some embodiments, the nitrile-based compound is present in an amount from about 0.1 to about 10 wt % based on total weight of the organic electrolyte solution.

In some embodiments, the organic solution comprises a low viscosity solvent.

In some embodiments, the organic solution is selected from dialkyl carbonate, cyclic carbonate, linear or cyclic ester, linear or cyclic amide, aliphatic nitrile, linear or cyclic ether, and derivatives thereof.

In some embodiments, the organic solution is selected from dimethyl carbonate (DMC), ethylmethyl carbonate (EMC), methylpropyl carbonate, ethylpropyl carbonate, diethyl carbonate (DEC), dipropyl carbonate, propylene carbonate (PC), ethylene carbonate (EC), fluoroethylene carbonate (FEC), butylene carbonate, ethyl propionate, ethyl butyrate, acetonitrile, succinonitrile (SN), dimethylsulfoxide, dimethylformamide, dimethylacetamide, γ-valerolactone, γ-butyrolactone, and tetrahydrofuran.

In some embodiments, the concentration of the lithium salt in the electrolyte is from about 0.01 to about 2.0M.

Another aspect of the disclosed technology provides a lithium battery comprising the organic electrolyte solution, the organic electrolyte solution comprising a lithium salt;
an organic solution;
a thiophene-based compound represented by Formula 1

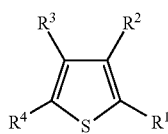

<Formula 1>

Wherein:
$R^1$, R, $R^3$ and $R^4$ are each independently a nonpolar functional group, or a polar functional group including a hetero atom of Group 13 to Group 16 of the periodic table of the elements, and
at least one of $R^1$, $R^2$, $R^3$ and $R^4$ are a —CN group; and
a nitrile-based compound represented by Formula 2;

NC—X—CN           <Formula 2> wherein X is a substituted or unsubstituted linear or branched $C_1$-$C_{20}$ alkylene group, and wherein the substituted group of the alkylene group is a nonpolar functional group or a polar functional group including a hetero atom of Group 13 to Group 16 of the periodic table of the elements.

In some embodiments, in a lithium battery comprising the organic electrolyte solution, the polar functional group comprises at least one hetero-atom of O, N, P, S, Si, and B.

In some embodiments, in a lithium battery comprising the organic electrolyte solution, the polar functional group is selected from of —F, —Cl, —Br, —I, —CN, —$R^9$CN, —C(=O)$OR^{10}$, —OC(=O)$R^{10}$, —$OR^{10}$, —OC(=O)$OR^{10}$, —$R^9$OC(=O)$OR^{10}$, —C(=O)$R^{10}$, —$R^9$C(=O)$R^{10}$, —OC(=O)$R^{10}$, —$R^9$OC(=O)$R^{10}$, —($R^9$O)$_k$—$OR^{10}$, —($OR^9$)$_k$—$OR^{10}$, —C(=O)—O—C(=O)$R^{10}$, —$R^9$C(=O)—O—C(=O)$R^{10}$, —$SR^{10}$, —$R^9$$SR^{10}$, —$SSR^{10}$, —$R^9$$SSR^{10}$, —S(=O)$R^{10}$, —$R^9$S(=O)$R^{10}$, —$R^9$C(=S)$R^{10}$, —$R^9$C(=S)$SR^{10}$, —$R^9$$SO_3$$R^{10}$, —$SO_3$$R^{10}$, —NNC(=S)$R^{10}$, —$R^9$NNC(=S)$R^{10}$, —$R^9$N=C=S, —NCO, —$R^9$NCO, —$NO_2$, —$R^9$$NO_2$,

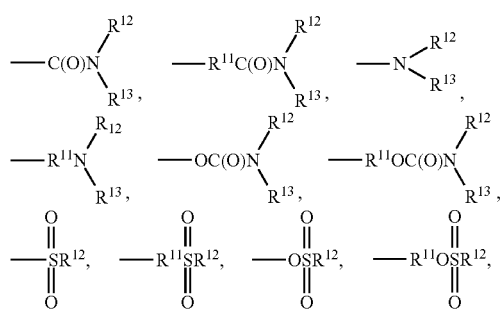

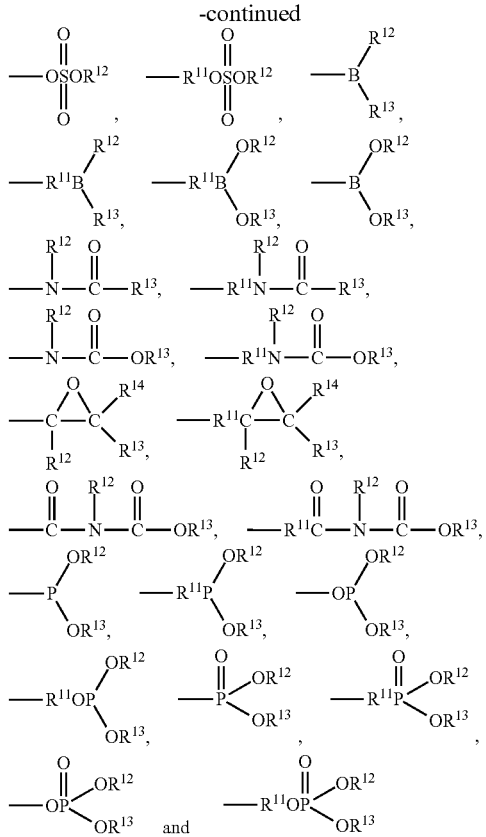

wherein:
$R^9$ and $R^{11}$ are each independently a $C_1$-$C_{20}$ alkylene group unsubstituted or substituted with a halogen atom or a cyano group, a $C_2$-$C_{20}$ alkenylene group unsubstituted or substituted with a halogen atom or a cyano group, a $C_2$-$C_{20}$ alkynylene group unsubstituted or substituted with a halogen atom or a cyano group, a $C_3$-$C_{12}$ cycloalkenylene group unsubstituted or substituted with a halogen atom or a cyano group, a $C_6$-$C_{40}$ arylene group unsubstituted or substituted with a halogen atom or a cyano group, a $C_2$-$C_{40}$ heteroarylene group unsubstituted or substituted with a halogen atom or a cyano group, a $C_7$-$C_{15}$ alkylarylene group unsubstituted or substituted with a halogen atom or a cyano group, a $C_7$-$C_{15}$ aralkylene group unsubstituted or substituted with a halogen atom or a cyano group;

$R^{10}$, $R^{12}$ and $R^{13}$ are each independently a hydrogen atom, a halogen atom, a $C_1$-$C_{20}$ alkyl group unsubstituted or substituted with a halogen atom or a cyano group, a $C_2$-$C_{20}$ alkenyl group unsubstituted or substituted with a halogen atom or a cyano group, a $C_2$-$C_{20}$ alkynyl group unsubstituted or substituted with a halogen atom or a cyano group, a $C_3$-$C_{12}$ cycloalkyl group unsubstituted or substituted with a halogen atom or a cyano group, a $C_6$-$C_{40}$ aryl group unsubstituted or substituted with a halogen atom or a cyano group, a $C_2$-$C_{40}$ heteroaryl group unsubstituted or substituted with a halogen atom or a cyano group, a $C_7$-$C_{15}$ alkylaryl group unsubstituted or substituted with a halogen atom or a cyano group, or a $C_7$-$C_{15}$ aralkyl group unsubstituted or substituted with a halogen atom or a cyano group; and k is an integer between 1 and 20.

In some embodiments, in a lithium battery comprising the organic electrolyte solution, wherein the polar functional group is selected from the group consisting of —F, —Cl, —Br, —I, —CN, —R$^{14}$CN, —NCO, —R$^{14}$NCO, —NO$_2$, —R$^{14}$NO$_2$, —C(=O)OR$^{15}$, —OC(=O)R$^{15}$, —OR$^{15}$, —OC(=O)OR$^{15}$, —R$^{14}$OC(=O)OR$^{15}$, —C(=O)R$^{15}$, —R$^{14}$C(=O)R$^{15}$, —OC(=O)R$^{15}$, —R$^{14}$OC(=O)R$^{15}$, —(R$^{14}$O)$_k$—OR$^{15}$, —(OR$^{14}$)$_k$—OR$^{15}$, —C(=O)—O—C(=O) R$^{15}$ and —R$^{14}$C(=O)—O—C(=O)R$^{15}$, wherein:

R$^{14}$ is a C$_1$-C$_{10}$ alkylene group unsubstituted or substituted with a halogen atom or a cyano group, R$^{15}$ is a hydrogen atom, a halogen atom, or a C$_1$-C$_{10}$ alkylene group unsubstituted or substituted with a halogen atom or a cyano group, and k is an integer between 1 and 20.

In some embodiments, the thiophene-based compound is represented by Formula 3:

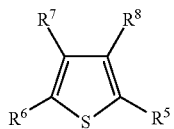

<Formula 3> wherein R$^5$, R$^6$, R$^7$ and R$^8$ are each independently a hydrogen atom, a halogen atom, or a C$_1$-C$_{10}$ alkyl group unsubstituted or substituted with a halogen atom or a cyano group; and at least one of R$^5$, R$^6$, R$^7$ and R$^8$ is a —CN group.

In some embodiments, the nitrile-based compound is represented by Formula 4

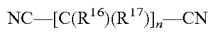

<Formula 4>

Wherein:

R$^{16}$ and R$^{17}$ are each independently a hydrogen atom, a halogen atom, —CN, a C$_1$-C$_{10}$ alkyl group unsubstituted or substituted with a halogen atom or a cyano group, or a C$_2$-C$_{10}$ alkenyl group unsubstituted or substituted with a halogen atom or a cyano group;

at least one of R$^{16}$ and R$^{17}$ is —CN; and n is an integer between 1 and 16.

In some embodiments, in a lithium battery comprising the organic electrolyte solution, the thiophene-based compound is

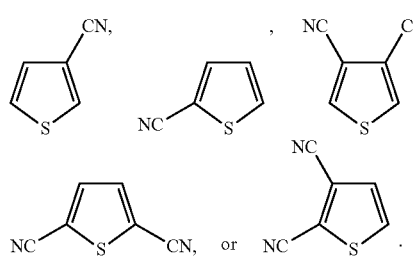

In some embodiments, in a lithium battery comprising the organic electrolyte solution, the nitrile-based compound is

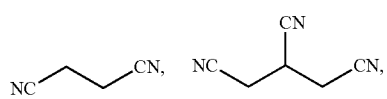

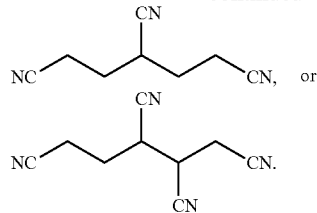

In some embodiments, in a lithium battery comprising the organic electrolyte solution, the thiophene-based compound is present in an amount from about 0.001 to about 5 wt % based on total weight of the organic electrolyte solution.

In some embodiments, in a lithium battery comprising the organic electrolyte solution, the nitrile-based compound is present in an amount from about 0.1 to about 10 wt % based on total weight of the organic electrolyte solution.

In some embodiments, in a lithium battery comprising the organic electrolyte solution, the organic solution comprises a low viscosity solvent.

In some embodiments, in a lithium battery comprising the organic electrolyte solution, the organic solution is selected from dialkyl carbonate, cyclic carbonate, linear or cyclic ester, linear or cyclic amide, aliphatic nitrile, linear or cyclic ether, and derivatives thereof.

In some embodiments, in a lithium battery comprising the organic electrolyte solution, the organic solution is selected from dimethyl carbonate (DMC), ethylmethyl carbonate (EMC), methylpropyl carbonate, ethylpropyl carbonate, diethyl carbonate (DEC), dipropyl carbonate, propylene carbonate (PC), ethylene carbonate (EC), fluoroethylene carbonate (FEC), butylene carbonate, ethyl propionate, ethyl butyrate, acetonitrile, succinonitrile (SN), dimethylsulfoxide, dimethylformamide, dimethylacetamide, γ-valerolactone, γ-butyrolactone, and tetrahydrofuran.

In some embodiments, in a lithium battery comprising the organic electrolyte solution, the concentration of the lithium salt in the electrolyte is from about 0.01 to about 2.0M.

In a further aspect of the present disclosure, by using an organic electrolyte solution containing an additive with a new composition, the stability and lifetime of the lithium batteries can be improved while the volumetric change can be prevented.

DETAILED DESCRIPTION OF CERTAIN INVENTIVE EMBODIMENTS

Figure 1:
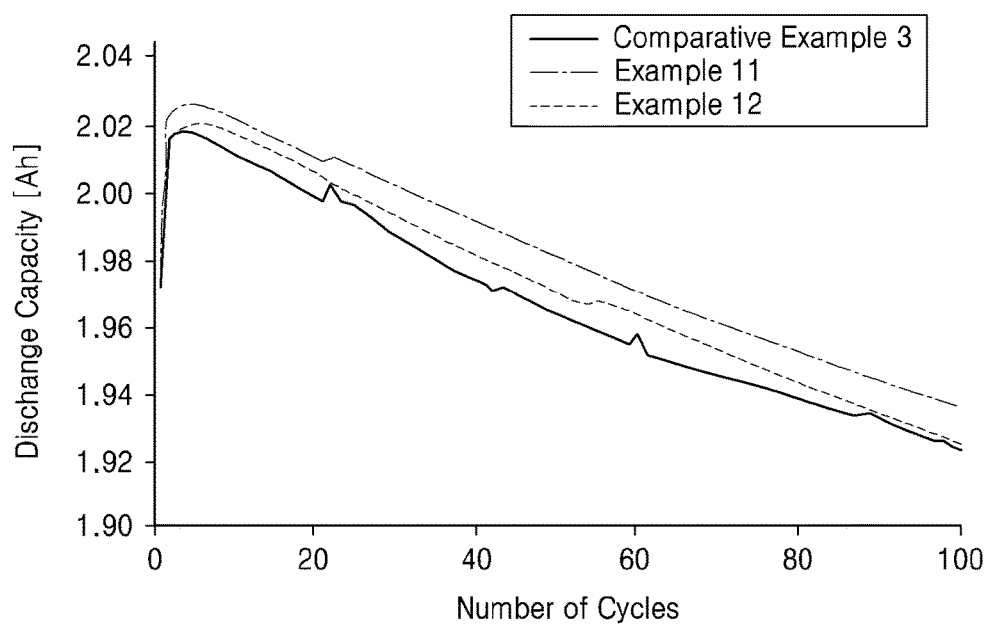
FIG. 1 is a graph illustrating discharge capacity at room temperature of lithium batteries prepared in Examples 11 and 12 and Comparative Example 3.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, organic electrolyte solutions according to embodiments of the present disclosure, and lithium batteries using the same are described further in detail.

In an embodiment of the present disclosure, the organic electrolyte solutions include a lithium salt; an organic solution; a thiophene-based compounds represented by Formula 1:

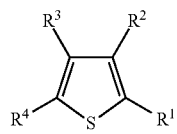
<Formula 1> a lithium salt;
an organic solution;
a thiophene-based compound represented by Formula 1

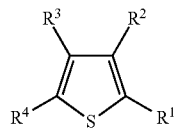
<Formula 1>

Wherein:
$R^1$, R, $R^3$ and $R^4$ are each independently a nonpolar functional group, or a polar functional group including a hetero atom of Group 13 to Group 16 of the periodic table of the elements, and
at least one of $R^1$, $R^2$, $R^3$ and $R^4$ are a —CN group; and
a nitrile-based compound represented by Formula 2;

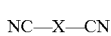
NC—X—CN      <Formula 2> wherein X is a substituted or unsubstituted linear or branched $C_1$-$C_{20}$ alkylene group, and wherein the substituted group of the alkylene group is a nonpolar functional group or a polar functional group including a hetero atom of Group 13 to Group 16 of the periodic table of the elements.

When the additives are added into the electrolytes of lithium batteries, performances of the batteries such as stability and lifetime can be improved. Further, the use of the additives can also suppress volumetric changes in lithium batteries.

The reasons why the electrolyte containing both the thiophene-based compound and nitrile-based compound simultaneously can improve the performances of lithium batteries are described in more detail herein below. However, they are for illustrative purposes only and are not intended to limit the scope of the present disclosure.

The thiophene-based and/or nitrile-based compounds become oxidized by donating electrons to the surface of a positive electrode during a charging process. The thiophene-based and/or nitrile-based compounds may react with already oxidized polar solvent molecules thereby changing the properties of the protection layer formed on the surface of the positive electrode. The thiophene-based compounds and/or nitrile-based compounds can more easily donate electrons than polar solvents. That is, the thiophene-based and/or nitrile-based compounds can be oxidized at a voltage lower than that of a polar solvent and become oxidized before the polar solvent is oxidized.

For example, during charging, the thiophene-based and/or nitrile-based compounds can be more easily oxidized and/or decomposed into radicals and/or ions compared to polar solvents. Accordingly, the radicals and/or ions can easily bind to transition metals being eluted onto the surface of a positive electrode and form an insoluble compound. The formed insoluble compound become precipitated on the positive electrode surface or form an additional insoluble compound by further reacting with a solvent. The radicals and/or ions can also form a composite on the surface of the positive electrode by reacting with various transition metals present on the positive electrode surface. For example, cyano ions (CN—) separated from the thiophene-based and/or nitrile-based compounds can form a complex with transition metal ions of positive electrode active materials. The complex can form a modified protection layer with improved stability to maintain a stable state even after a long term charging and discharging as compared with the protection layer formed only by an organic solution. Additionally, the modified protection layer can effectively block a penetration of an organic solution, which can solvate the lithium ions, into the interior of an electrode during the intercalation of lithium ions. Therefore, the modified protection layer can more effectively prevent the direct contact between the organic solution and the positive electrode, thereby improving the irreversibility of the intercalation/deintercalation of lithium ions and subsequently improving stability and lifetime of the batteries while preventing the volumetric changes.

In an embodiment of the present disclosure, in the thiophene-based compound represented by Formula 1 and nitrile-based compound represented by Formula 2, the polar functional group can be selected from the group consisting of —F, —Cl, —Br, —I, —CN, —$R^{14}$CN, —NCO, —$R^{14}$—NCO, —$NO_2$, —$R^{14}NO_2$, —C(=O)$OR^{15}$, —OC(=O)$R^{15}$, —$OR^{15}$, —OC(=O)$OR^{15}$, —$R^{14}$OC(=O)$OR^{15}$, —C(=O)$R^{15}$, —$R^{14}$C(=O)$R^{15}$, —OC(=O)$R^{15}$, —$R^{14}$OC(=O)$R^{15}$, —($R^{14}$O)$_k$—$OR^{15}$, —($OR^{14}$)$_k$—$OR^{15}$, —C(=O)—O—C(=O)$R^{15}$ and —$R^{14}$C(=O)—O—C(=O)$R^{15}$, For example, in the thiophene-based compound represented by Formula 1 and the nitrile-based compound represented by Formula 2, the polar functional group may include at least one hetero atom of O, N, P, S, Si, and B.

In an embodiment of the present disclosure, in the thiophene-based compound represented by Formula 1 and the nitrile-based compound represented by Formula 2, the polar functional group can be selected from —F, —Cl, —Br, —I, —CN, —R$^9$CN, —C(=O)OR$^{10}$, —OC(=O)R$^{10}$, —OR$^{10}$, —OC(=O)OR$^{10}$, —R$^9$OC(=O)OR$^{10}$, —C(=O)R$^{10}$, —R$^9$C(=O)R$^{10}$, —OC(=O)R$^{10}$, —R$^9$OC(=O)R$^{10}$, —(R$^9$O)$_k$—OR$^{10}$, —(OR$^9$)$_k$—OR$^{10}$, —C(=O)—O—C(=O)R$^{10}$, —R$^9$C(=O)—O—C(=O)R$^{10}$, —SR$^{10}$, —R$^9$SR$^{10}$, —SSR$^{10}$, —R$^9$SSR$^{10}$, —S(=O)R$^{10}$, —R$^9$S(=O)R$^{10}$, —R$^9$C(=S)R$^{10}$, —R$^9$C(=S)SR$^{10}$, —R$^9$SO$_3$R$^{10}$, —SO$_3$R$^{10}$, —NNC(=S)R$^{10}$, —R$^9$NNC(=S)R$^{10}$, —R$^9$N=C=S, —NCO, —R$^9$—NCO, —NO$_2$, —R$^9$NO$_2$,

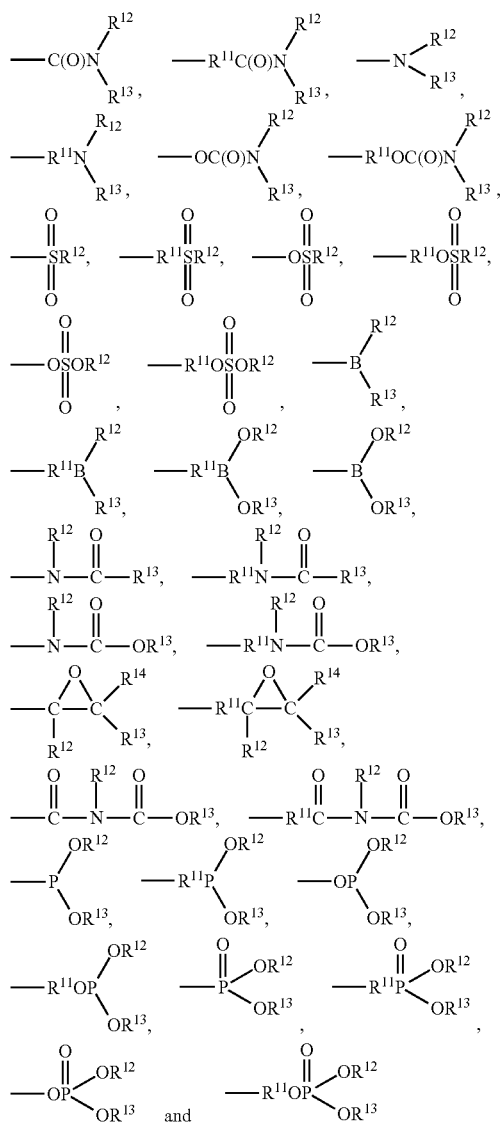

R$^9$ and R$^{11}$ are each independently a C$_1$-C$_{20}$ alkylene group unsubstituted or substituted with a halogen atom or a cyano group, a C$_2$-C$_{20}$ alkenylene group unsubstituted or substituted with a halogen atom or a cyano group, a C$_2$-C$_{20}$ alkynylene group unsubstituted or substituted with a halogen atom or a cyano group, a C$_3$-C$_{12}$ cycloalkenylene group unsubstituted or substituted with a halogen atom or a cyano group, a C$_6$-C$_{40}$ arylene group unsubstituted or substituted with a halogen atom or a cyano group, a C$_2$-C$_{40}$ heteroarylene group unsubstituted or substituted with a halogen atom or a cyano group, a C$_7$-C$_{15}$ alkylarylene group unsubstituted or substituted with a halogen atom or a cyano group, a C$_7$-C$_{15}$ aralkylene group unsubstituted or substituted with a halogen atom or a cyano group;

R$^{10}$, R$^{12}$ and R$^{13}$ are each independently a hydrogen atom, a halogen atom, a C$_1$-C$_{20}$ alkyl group unsubstituted or substituted with a halogen atom or a cyano group, a C$_2$-C$_{20}$ alkenyl group unsubstituted or substituted with a halogen atom or a cyano group, a C$_2$-C$_{20}$ alkynyl group unsubstituted or substituted with a halogen atom or a cyano group, a C$_3$-C$_{12}$ cycloalkyl group unsubstituted or substituted with a halogen atom or a cyano group, a C$_6$-C$_{40}$ aryl group unsubstituted or substituted with a halogen atom or a cyano group, a C$_2$-C$_{40}$ heteroaryl group unsubstituted or substituted with a halogen atom or a cyano group, a C$_7$-C$_{15}$ alkylaryl group unsubstituted or substituted with a halogen atom or a cyano group, or a C$_7$-C$_{15}$ aralkyl group unsubstituted or substituted with a halogen atom or a cyano group; and k is an integer between 1 and 20.

In an embodiment of the present disclosure, in the thiophene-based compound represented by Formula 1 and the nitrile-based compound represented by Formula 2, the polar functional group can be selected from the group consisting of —F, —Cl, —Br, —I, —CN, —R$^{14}$CN, —NCO, —R$^{14}$—NCO, —NO$_2$, —R$^{14}$NO$_2$, —C(=O)OR$^{15}$, —OC(=O)R$^{15}$, —OR$^{15}$, —OC(=O)OR$^{15}$, —R$^{14}$OC(=O)OR$^{15}$, —C(=O)R$^{15}$, —R$^{14}$C(=O)R$^{15}$, —OC(=O)R$^{15}$, —R$^{14}$OC(=O)R$^{15}$, —(R$^{14}$O)$_k$—OR$^{15}$, —(OR$^{14}$)$_k$—OR$^{15}$, —C(=O)—O—C(=O)R$^{15}$ and —R$^{14}$C(O)—O—)—O—C(=O)R$^{15}$, wherein R$^{14}$ can be a C$_1$-C$_{10}$ alkylene group unsubstituted or substituted with a halogen atom or a cyano group;

R$^{15}$ can be a hydrogen atom, a halogen atom, or a C$_1$-C$_{10}$ alkylene group unsubstituted or substituted with a halogen atom or a cyano group; and k can be an integer between 1 and 20.

In an embodiment of the present disclosure, the thiophene-based compound can be represented by Formula 3:

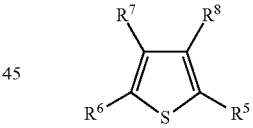

<Formula 3> wherein R$^5$, R$^6$, R$^7$ and R$^8$ can be each independently a hydrogen atom; a halogen atom, or a C$_1$-C$_{10}$ alkyl group unsubstituted or substituted with a halogen atom or a cyano group; and at least one of R$^5$, R$^6$, R$^7$ and R$^8$ can be —CN.

In an embodiment of the present disclosure, the nitrile-based compound may be represented by Formula 4:

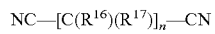

NC—[C(R$^{16}$)(R$^{17}$)]$_n$—CN        <Formula 4> wherein:

R$^{16}$ and R$^{17}$ can be each independently a hydrogen atom, a halogen atom, —CN, a C$_1$-C$_{10}$ alkyl group unsubstituted or substituted with a halogen atom or a cyano group, or a C$_2$-C$_{10}$ alkenyl group unsubstituted or substituted with a halogen atom or a cyano group;

at least one of R$^{16}$ and R$^{17}$ can be —CN; and n is an integer between 1 and 16.

In some embodiments, in Formula 3, R$^5$, R$^6$, R$^7$ and R$^8$ can be each independently a hydrogen atom, a methyl group, an ethyl group, a propyl group, an isopropyl group, n-butyl group, a tert-butyl group, a pentyl group, a hexyl group, a heptyl group, an octyl group, a nonyl group, or a decyl group.

For example, in certain embodiments, in Formula 4, $R^{16}$ and $R^{17}$ may be independently a methylene group substituted or unsubstituted with a cyano group, an ethylene group substituted or unsubstituted with a cyano group, a propylene group substituted or unsubstituted with a cyano group, a butylene group substituted or unsubstituted with a cyano group, a pentylene group substituted or unsubstituted with a cyano group, a hexylene group substituted or unsubstituted with a cyano group, a heptylene group substituted or unsubstituted with a cyano group, an octylene group substituted or unsubstituted with a cyano group, a nonylene group substituted or unsubstituted with a cyano group, or a decylene group substituted or unsubstituted with a cyano group.

In an embodiment of the present disclosure, the thiophene-based compound may be

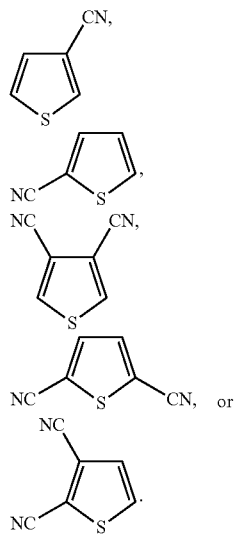

In an embodiment of the present disclosure, the nitrile-based compound may be represented by Formulas 10-13:

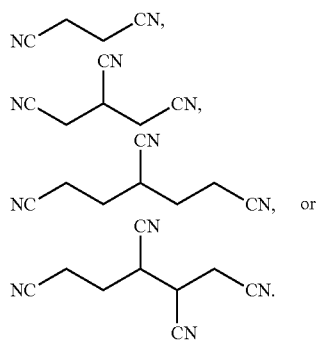

In an embodiment of the present disclosure, the thiophene-based compound may be present in an amount from about 0.001 to about 5 wt % based on total weight of the organic electrolyte solution, but they are not necessarily limited thereto. In some embodiments, the amount of the thiophene based compounds may be appropriately adjusted when needed. For example, the amount of the thiophene-based compound in the organic electrolyte solution may be in the range of about 0.005 wt % to about 2 wt % based on the total weight of the organic electrolyte solution. For example, the amount of the thiophene-based compound in the organic electrolyte solution may be in the range of about 0.01 wt % to about 1 wt % based on the total weight of the organic electrolyte solution. When the amount of the compound is within these ranges, a lithium battery with further improved characteristics may be obtained In an embodiment of the present disclosure, the nitrile-based compound may be present in an amount of from about 0.1 to about 10 wt % based on total weight of the organic electrolyte solution, but they are not necessarily limited thereto. In some embodiments, the amount of the thiophene based compounds may be appropriately adjusted when needed. For example, the amount of the nitrile-based compound in the organic electrolyte solution may be in the range of about 0.1 wt % to about 7 wt % based on the total amount of the organic electrolyte solution. For example, the amount of the nitrile-based compound in the organic electrolyte solution may be in the range of about 0.5 wt % to about 5 wt % based on the total amount of the organic electrolyte solution. When the amount of the compound is within these ranges, a lithium battery with further improved characteristics may be obtained In some embodiments, in the organic electrolyte solution, the organic solution may include a low viscosity solvent. The low viscosity solvent refers to a solvent which has a viscosity less than 10 cps at 25° C., 1 atm.

In some embodiments, the organic solution may be at least one of dialkyl carbonate, cyclic carbonate, linear or cyclic ester, linear or cyclic amide, aliphatic nitrile, linear or cyclic ether, and derivatives thereof.

More specifically, in some embodiments, the organic solution may selected from dimethyl carbonate (DMC), ethylmethyl carbonate (EMC), methylpropyl carbonate, ethylpropyl carbonate, diethyl carbonate (DEC), dipropyl carbonate, propylene carbonate (PC), ethylene carbonate (EC), fluoroethylene carbonate (FEC), butylene carbonate, ethyl propionate, ethyl butyrate, acetonitrile, succinonitrile (SN), dimethylsulfoxide, dimethylformamide, dimethylacetamide, γ-valerolactone, γ-butyrolactone, tetrahydrofuran, and combinations thereof, but they are not necessarily limited thereto. Any low viscosity solvent available in the art may be used.

In some embodiments, in the organic electrolyte solution, the concentration of the lithium salt in the electrolyte may be from about 0.01 to about 2.0M, but they are not necessarily limited thereto. In some embodiments, the concentration of the lithium salt may be appropriately adjusted when needed. When the concentration of the lithium salt is within these ranges, a lithium battery with further improved characteristics may be obtained.

In some embodiments, a lithium salt used in the organic electrolyte solution is not specifically limited and any lithium salt used in the art may be used. For example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$(x, y are each independently an integer between 1 and 20), LiCl, LiI, or mixtures thereof.

The organic electrolyte solution described herein may be in a liquid or gel state. The organic electrolyte solution may be prepared by adding a lithium salt and the additives described above.

In another exemplary embodiment, the lithium batteries may include a positive electrode, an negative electrode and an organic electrolyte solution as described above. The lithium batteries are not specifically limited but may include lithium secondary batteries such as lithium ion batteries, lithium ion polymer batteries, and lithium sulfur batteries as well as lithium primary batteries.

For example, the lithium batteries may be manufactured as follows.

First, a positive electrode is prepared. For example, a positive active material, a conducting agent, a binder and a solvent are mixed to prepare a positive active material composition. In some embodiments, the positive active material composition may be directly coated on a metallic current collector and dried to prepare a positive electrode plate. In some embodiments, the positive active material composition may be cast on a separate support to form a positive active material film, which may then be separated from the support and laminated on the metal current collector to prepare a positive electrode plate. The shape of a positive electrode is not limited to the above but it may be in a shape other than those described above.

The positive active material may include any material available in the art. In some embodiments, the positive active material may be a lithium-containing metal oxide. In some embodiments, the positive active material may be at least one of a composite oxide of lithium with a metal selected from among Co, Mn, Ni, and a combination thereof. In some embodiments, the positive active material may be a compound represented by one of the following formulae: $Li_aA_{1-b}B_bD_2$ (in the formula, $0.90 \leq a \leq 1.8$, and $0 \leq b \leq 0.5$); $Li_aE_{1-b}B_bO_{2-c}D_c$ (in the formula, $0.90 \leq a \leq 1.8$, $0 \leq b \leq 0.5$, $0 \leq c \leq 0.05$); $LiE_{2-b}B_bO_{4-c}D_c$ (in the formula, $0 \leq b \leq 0.5$, $0 \leq c \leq 0.05$); $Li_aNi_{1-b-c}Co_bB_cD_\alpha$ (in the formula, $0.90 \leq a \leq 1.8$, $0 \leq b \leq 0.5$, $0 \leq c \leq 0.05$, $0 < \alpha \leq 2$); $Li_aNi_{1-b-c}Co_bB_cO_{2-\alpha}F_\alpha$ (in the formula, $0.90 \leq a \leq 1.8$, $0 \leq b \leq 0.5$, $0 \leq c \leq 0.05$, $0 < \alpha < 2$); $Li_aNi_{1-b-c}Co_bB_cO_{2-\alpha}F_2$ (in the formula, $0.90 \leq a \leq 1.8$, $0 \leq b \leq 0.5$, $0 \leq c \leq 0.05$, $0 < \alpha < 2$); $Li_aNi_{1-b-c}Mn_bB_cD_\alpha$ (in the formula, $0.90 \leq a \leq 1.8$, $0 \leq b \leq 0.5$, $0 \leq c \leq 0.05$, $0 < \alpha \leq 2$); $Li_aNi_{1-b-c}Mn_bB_cO_{2-\alpha}F_\alpha$ (in the formula, $0.90 \leq a \leq 1.8$, $0 \leq b \leq 0.5$, $0 \leq c \leq 0.05$, $0 < \alpha < 2$); $Li_aNi_{1-b-c}Mn_bB_cO_{2-\alpha}F_2$ (in the formula, $0.90 \leq a \leq 1.8$, $0 \leq b \leq 0.5$, $0 \leq c \leq 0.05$, $0 < \alpha < 2$); $Li_aNi_bE_cG_dO_2$ (in the formula, $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (in the formula, $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (in the formula, $0.90 \leq a \leq 1.8$, $0.001 \leq b \leq 0.1$); $Li_aCoG_bO_2$ (in the formula, $0.90 \leq a \leq 1.8$, $0.001 \leq b \leq 0.1$); $Li_aMnG_bO_2$ (in the formula, $0.90 \leq a \leq 1.8$, $0.001 \leq b \leq 0.1$); $Li_aMn_2G_bO_4$ (in the formula, $0.90 \leq a \leq 1.8$, $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; $LiFePO_4$; and combinations thereof.

In the formulae above, A may be selected from the group consisting of Ni, Co, Mn, or combinations thereof; B may be selected from the group consisting of Al, Ni, Co, Mn, Cr, Fe, Mg, Sr, V, rare earth elements or combinations thereof; D may be selected from the group consisting of O, F, S, P, or combinations thereof; E may be selected from the group consisting of Co, Mn, or combinations thereof; F may be selected from the group consisting of F, S, P, or combinations thereof; G may be selected from the group consisting of Al, Cr, Mn, Fe, Mg, La, Ce, Sr, V, or combinations thereof; Q may be selected from the group consisting of Ti, Mo, Mn, or combinations thereof; I may be selected from the group consisting of Cr, V, Fe, Sc, Y, or combinations thereof; J may be selected from the group consisting of V, Cr, Mn, Co, Ni, Cu, or combinations thereof.

For example, the positive active material may be $LiCoO_2$, $LiMn_xO_{2x}$ (x=1, 2), $LiNi_{1-x}Mn_xO_{2x}$ (0<x<1), $LiNi_{1-x-y}Co_xMn_yO_2$ ($0 \leq x \leq 0.5$, $0 \leq y \leq 0.5$), $LiFePO_4$, etc.

The compounds listed above as positive active materials may have a surface coating layer (hereinafter, "coating layer"). Alternatively, a mixture of a compound without a coating layer and a compound having a coating layer, the compounds being selected from the compounds listed above, may be used. In some embodiments, the coating layer may include at least one compound of a coating element selected from the group consisting of oxide, hydroxide, oxyhydroxide, oxycarbonate, and hydroxycarbonate of the coating element. In some embodiments, the compounds for the coating layer may be amorphous or crystalline. In some embodiments, the coating elements for the coating layer may be Mg, Al, Co, K, Na, Ca, Si, Ti, V, Sn, Ge, Ga, B, As, Zr or mixtures thereof. In some embodiments, the coating layer may be formed by using any method which may not adversely affect the physical properties of a positive electrode active material when a compound of the coating elements is used. For example, the coating layer may be formed using a spray coating method, a dipping method, or the like. This is obvious to those of skill in the art, and thus a detailed description thereof will be omitted.

Examples of the conducting agent may include carbon black and graphite granules, but are not limited thereto. Any material available as a conducting agent in the art may be used.

In some embodiments, examples of the binder may include vinylidene fluoride/hexafluoropropylene copolymer, poly vinylidene fluoride (PVDF), polyacrylonitrile, polymethylmethacrylate, polytetrafluoroethylene, and mixtures thereof or styrene butadiene rubber polymer, but are not limited thereto, and any material available as a binder in the art may be used.

In some embodiments, examples of the solvent may include N-methyl pyrrolidone, acetone or water, but are not limited thereto, and any material available as a solvent in the art may be used.

The amount of the positive active material, the conducting agent, the binder and the solvent may be in ranges that are conventionally used in lithium batteries. Depending on the use and features of lithium batteries at least one of the conducting agent, the binder and the solvent may be omitted.

Next, a negative electrode is prepared.

For example, a negative active material, a conducting agent, a binder and a solvent may be mixed to prepare a negative active material composition. In some embodiments, the negative active material composition may be directly coated on a metallic current collector and dried to prepare a negative electrode plate. In some embodiment, the negative active material composition may be cast on a separate support to form a negative active material film, which may then be separated from the support and laminated on the metal collector to prepare a negative electrode plate. The shape of a negative electrode is not limited to the above but it may be in any shape other than those described above.

In some embodiments, the negative electrode active material may be any negative active material for a lithium battery available in the art. For example, the negative active material may include at least one selected from the group consisting of lithium metals, a metal that is alloyable with lithium, transition metal oxides, a non-transitional metal oxides, carbonaceous materials, and any combinations thereof.

For example, the instant metal alloyable with lithium may be Si, Sn, Al, Ge, Pb, Bi, Sb, Si—Y alloy (wherein Y is an alkali metal, alkali earth metal, a Group XIII elements, a Group XIV elements, transition metals, rare earth elements or combinations of the elements, except for Si), Sn—Y alloy (wherein Y is an alkali metal, alkali earth metal, a Group XIII elements, a Group XIV elements, transition metals, rare earth elements or combinations of the elements, except for Sn), etc. Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or combinations thereof.

For example, the instant transition metal oxides may include lithium titanium oxide, vanadium oxide, lithium vanadium oxide, etc.

For example, the instant nontransition metal oxides may include $SnO_2$, $SiO_x(0<x<2)$, etc.

In some embodiments, the carbonaceous materials may include crystalline carbon, amorphous carbon or combinations thereof. For example, the crystalline carbon may include graphite such as natural graphite or artificial graphite that are in planar, flake, spherical or fibrous form. For example, the amorphous carbon may include soft carbon (carbon sintered at low temperature), hard carbon, mesophase pitch carbide, sintered cokes, etc.

In a negative active material composition, the conducting agent and the binder may be the same as in the positive active material composition.

The amount of the negative active material, the conducting agent, the binder and the solvent used in the present disclosure is that conventionally used in lithium batteries. Depending on the use and features of lithium batteries at least one of the conducting agent, the binder and the solvent may be omitted.

After a negative electrode is prepared, a separator to be disposed between the positive electrode and the negative electrode is prepared.

In some embodiments, the separator for the lithium battery may be anything that can be conventionally used in lithium batteries. For example, a separator may have low resistance against ionic migration of ions in an electrolyte and have an excellent-retaining ability. For example, the separator may be selected from the group consisting of glass fiber, polyester, polyethylene, polypropylene, polytetrafluoroethylene (PTFE) or combinations thereof, each of which may be a non-woven fabric or a woven fabric. For example, a windable separator such as polyethylene, and polypropylene, may be used in lithium ion batteries. A separator with excellent organic electrolyte solution-retaining ability may be used for a lithium ion polymer batteries. For example, the separator may be manufactured as follows.

In some embodiments, a separator composition is prepared by mixing a polymer resin, a filler, and a solvent. The separator composition may be directly coated on the electrodes and dried to form a separator. Alternatively, the separator composition may be cast on a support and dried to form a separator film, and then the separator film may be separated from the support and laminated on the electrodes to form a separator.

In some embodiments, the polymer resin used to manufacture the separator may be a material that can be commonly used as a binder for electrode plates. For example, the polymer resin may be vinylidene fluoride/hexafluoropropylene copolymer, poly vinylidene fluoride (PVDF), polyacrylonitrile, polymethylmethacrylate, polytetrafluoroethylene, and a mixture thereof may be used.

Then, the organic electrolyte solution is prepared as follows.

Figure 8:
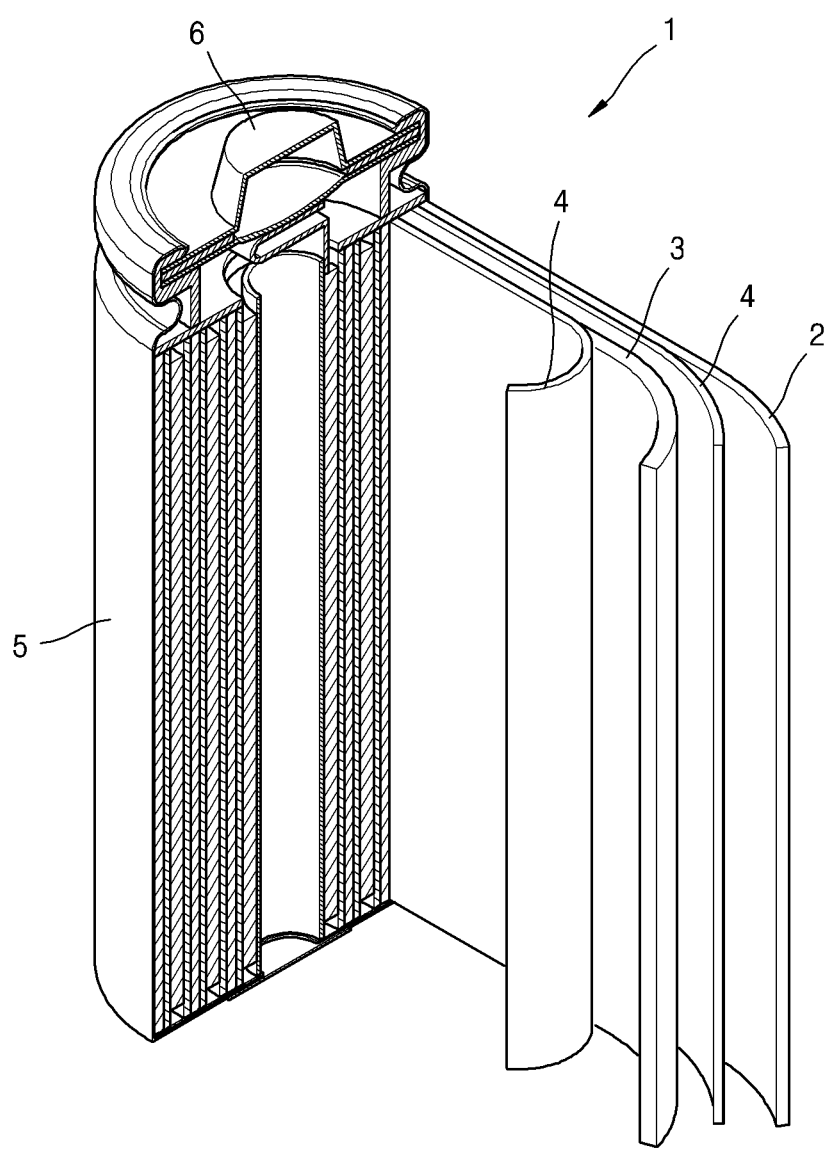
FIG. 8 is a diagram of lithium batteries according to an embodiment of the present disclosure.

As shown in FIG. 8, the instant lithium battery 1 includes a positive electrode 3, an negative electrode 2, and a separator 4. The positive electrode 3, the negative electrode 2 and the separator 4 are wound or folded and then sealed into a battery case 5. Then, an organic electrolyte solution is introduced into the battery case 5 and sealed with a cap assembly 6 to complete a lithium battery 1. The battery case may be prepared in a cylindrical, squared or thin-film shape. For example, the lithium battery may be a large scale thin film battery or a lithium ion battery.

A battery assembly is formed by disposing a separator between the positive electrode and the negative electrode. The battery assembly may be stacked in a bi-cell structure and filled with an organic electrolyte solution, and the resulting assembly may be put into a pouch and hermetically sealed, thereby completing the manufacture of a lithium ion polymer battery.

In addition, a plurality of the battery assemblies may be stacked to form a battery pack, and thus prepared battery pack may be used in various devices requiring high capacity and high output. For example, they can be used in notebook computers, smartphones, electric vehicles (EV), etc.

The lithium battery may be used in electric vehicles due to its excellent lifetime characteristics and high rate capabilities, for example, hybrid vehicles such as plug-in hybrid electric vehicle (PHEV). Further, the lithium battery may be also used in the field where a considerable amount of power storage is required, for example, electric bicycles, power tools, etc.

Aspects of the present disclosure will be described in further detail with reference to the following examples and comparative examples. These examples are for illustrative purposes only and are not intended to limit the scope of the present disclosure.

Preparation of Organic Electrolyte Solution

Example 1

An organic electrolyte solution was prepared by adding 0.9M $LiPF_6$ and 0.2 wt % $LiBF_4$ as a lithium salt, 6 wt % of ethylene carbonate (FEC), 2 wt % of 1,3-propane sultone (PS), 0.5 wt % of vinylethylene carbonate (VEC), 0.2 wt % of thiophene-3-carbonitrile represented by Formula 5, and 3.0 wt % of succinonitrile represented by Formula 10, based on the total weight of the organic electrolyte solution, into a mixed solvent of ethylene carbonate (EC), ethylmethyl carbonate (EMC) and diethyl carbonate (DEC), wherein the latter three components were originally in a volume ratio of 3:5:2.

Example 2

An organic electrolyte solution was prepared in the same manner as in Example 1 except that thiophene-3,4-dicarbonitrile represented by Formula 7 was added as an additive instead of thiophene-3-carbonitrile.

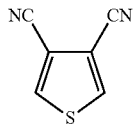

<Formula 7>

Example 3

An organic electrolyte solution was prepared in the same manner as in Example 1 except that thiophene-2-carbonitrile represented by Formula 6 was added as an additive instead of thiophene-3-carbonitrile.

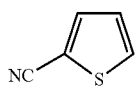

<Formula 6>

Example 4

An organic electrolyte solution was prepared by adding 0.9M $LiPF_6$ and 0.2 wt % $LiBF_4$ as a lithium salt, 6 wt % of ethylene carbonate (FEC), 2 wt % of 1,3-propane sultone (PS), 0.5 wt % of vinylethylene carbonate (VEC), 0.2 wt % of thiophene-3-carbonitrile represented by Formula 5, and 2.0 wt % of 1,3,5-pentanetricarbonitrile represented by Formula 11, based on the total weight of the organic electrolyte solution, into a mixed solvent of ethylene carbonate (EC), ethylmethyl carbonate (EMC) and diethyl carbonate (DEC), wherein the latter three components were originally in a volume ratio of 3:5:2.

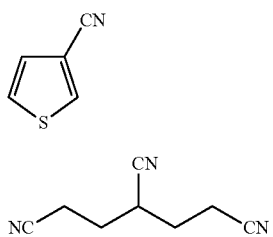

<Formula 5>

<Formula 11>

Example 5

An organic electrolyte solution was prepared in the same manner as in Example 4 except that 1 wt % of succinonitrile represented by Formula 10 was further added as an additive.

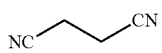

<Formula 10>

Example 6

An organic electrolyte solution was prepared in the same manner as in Example 4 except that 0.2 wt % of thiophene-3,4-dicarbonitrile and 3.0 wt % of 1,2,3-propanetricarbonitrile represented by Formula 12 were added as an additive instead of 0.2 wt % of thiophene-3-carbonitrile and 2.0 wt % of 1,3,5-pentanetricarbonitrile.

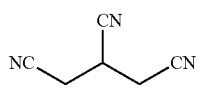

<Formula 12>

Example 7

An organic electrolyte solution was prepared in the same manner as in Example 4 except that 3.0 wt % of 1,2,3-propanetricarbonitrile was added as an additive instead of 2.0 wt % of 1,3,5-pentanetricarbonitrile.

Example 8

An organic electrolyte solution was prepared in the same manner as in Example 1 except that the amount of thiophene-3-carbonitrile added as an additive was changed to 0.1 wt %.

Example 9

An organic electrolyte solution was prepared in the same manner as in Example 2 except that the amount of thiophene-3,4-dicarbonitrile added as an additive was changed to 0.1 wt %.

Example 10

An organic electrolyte solution was prepared in the same manner as in Example 1 except that 3.0 wt % of 1,2,3-propanetricarbonitrile was used as an additive instead of 3.0 wt % of succinonitrile.

Reference Example 1

An organic electrolyte solution was prepared by adding 0.9M $LiPF_6$ and 0.2 wt % $LiBF_4$ as a lithium salt, 6 wt % of ethylene carbonate (FEC), 2 wt % of 1,3-propane sultone (PS), 0.5 wt % of vinylethylene carbonate (VEC), and 0.05M 1,2,3-propanetricarbonitrile, relative to the total weight of the organic electrolyte solution, into a mixed solvent of ethylene carbonate (EC), ethylmethyl carbonate (EMC) and diethyl carbonate (DEC), wherein the latter three components were originally in a volume ratio of 3:5:2.

Reference Example 2

An organic electrolyte solution was prepared in the same manner as in Reference Example 1 except that 0.05M thiophene-3-carbonitrile was added instead of 0.05M 1,2,3-propane.

Reference Example 3

An organic electrolyte solution was prepared in the same manner as in Reference Example 1 except that 0.05M thiophene-3,4-dicarbonitrile was added instead of 0.05M 1,2,3-propanetricarbonitrile.

Comparative Example 1

An organic electrolyte solution was prepared in the same manner as in Example 1 except that 3.0 wt % of succinonitrile was added as an additive while 0.2 wt % of thiophene-3-carbonitrile was not added.

Comparative Example 2

An organic electrolyte solution was prepared in the same manner as in Reference Example 1 except that 1,2,3-propanetricarbonitrile additive was not added.

Preparation of Lithium Batteries

Example 11

Preparation of Negative Electrode 97 wt % of graphite particle with an average diameter of 25 μm (C1SR, Nippon Carbon Co., Ltd.), 1.5 wt % of styrene-butadiene rubber binder (ZEON Co., Ltd.) and 1.5 wt % of carboxymethylcellulose (CMC, NIPPON A&L) were added into distilled water after mixing, and stirred for about 60 minutes using a mechanical stirrer to obtain a negative active material slurry. The slurry was coated on a copper current collector with a thickness of about 10 μm using a Doctor Blade, dried using a hot-air dryer at 100° C. for about 0.5 hour. The resultant was placed under vacuum at 120° C. for about 4 hours, dried and subjected to roll press to prepare a negative electrode plate.

Preparation of Positive Electrode 92 wt % LiCoO2, and 4.0 wt % of carbon black powder (Samsung SDI, R787KS, Seoul, Korea) as a conducting agent and 4.0 wt % of polyvinylidenefluoride (PVdF, SOLEF® 6020, Seoul, Korea) were mixed together and added into a N-methyl-2-pyrrolidone solvent, stirred for about 30 minutes using a mechanical stirrer, and obtained a positive active material slurry. The slurry was coated on an aluminum collector with a thickness of about 20 μM using a Doctor Blade, dried using a hot-air dryer at 100° C. for about 0.5 hour. The resultant was placed under vacuum at 120° C. for about 4 hours, dried and subjected to roll press to prepare a positive electrode plate.

A square-shaped lithium battery was manufactured by using a polyethylene separator with a thickness of 20 μM (Asahi Chemical, STAR® 20, Seoul, Korea) as a separator, and the organic electrolyte solution prepared in Example 1 as an electrolyte solution.

Examples 12 to 20

A lithium battery was manufactured in the same manner as in Example 11 except that the organic electrolyte solutions prepared in Examples 2 to 10 were used respectively instead of that prepared in Example 1.

Comparative Example 3

A lithium battery was manufactured in the same manner as in Example 12 except that the organic electrolyte solution prepared in Comparative Example 1 was used instead of that prepared in Example 1.

Evaluation Example 1

Evaluation of Charging and Discharging Characteristics at Room Temperature (25° C.)

The lithium batteries manufactured in Examples 12 to 18 and Comparative Example 3 and 4 were charged at a constant current of 0.5 C rate at about 25° C. to a voltage of about 4.35, and then discharged with a constant current of 0.5 C rate to a voltage of about 2.75V (formation step, $1^{st}$ cycle). After completing the formation step, each of the lithium batteries was charged at a constant current of 0.5 C rate at about 25° C. to a voltage of 4.35V (versus Li) and then discharged with a constant current of 1.0 C rate to a voltage of 3.1V. This cycle of charging and discharging with a constant current rate was repeated 100 times.

Figure 3:
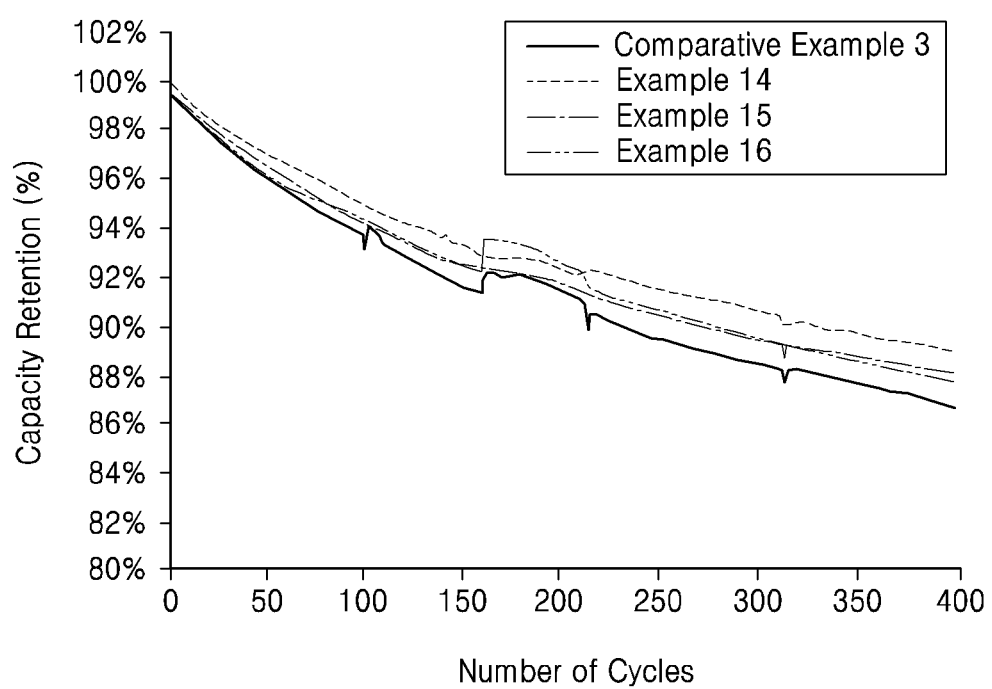
FIG. 3 is a graph illustrating capacity retention rate at room temperature of lithium batteries prepared in Examples 14 to 16 and Comparative Example 3.

The result of charging and discharging experiments are shown in Table 1, FIGS. 1 and 3. The capacity retention rate at the $100^{th}$ cycle is defined by the Equation 1 below.

Capacity retention rate=[discharge capacity at the $100^{th}$ cycle/discharge capacity at the $1^{st}$ cycle]× 100     <Equation 1>

However, the discharge capacity and the capacity retention rate for lithium batteries prepared in Examples 15 to 17 were calculated after charging and discharging up to the $400^{th}$ cycle.

TABLE 1

|  | Discharge capacity at the $100^{th}$ cycle [Ah] | Capacity retention rate at the $100^{th}$ cycle [%] |
| --- | --- | --- |
| Example 11 | 1.937 | 95.7 |
| Example 12 | 1.926 | 95.5 |
| Comparative Example 3 | 1.924 | 95.3 |

|  | Discharge capacity at the $400^{th}$ cycle [Ah] | Capacity retention rate at the $400^{th}$ cycle [%] |
| --- | --- | --- |
| Example 14 | 1.787 | 88.9 |
| Example 15 | 1.781 | 87.9 |
| Example 16 | 1.763 | 87.6 |
| Comparative Example 3 | 1.757 | 86.6 |

As shown in Table 1, FIGS. 1 and 3, the lithium batteries manufactured in Example 11 and 12 and 14 to 16, where two additives were added simultaneously, showed a considerable improvement in discharge capacity, lifetime characteristics, and thermal stability at high temperature compared to that manufactured in Comparative Example 3, where only a nitrile-based compound was used as an additive.

Evaluation Example 2

Evaluation of Charging and Discharging Characteristics at High Temperature (45° C.)

Experiments were performed in the same manner as in Evaluation Example 1 except that the charging/discharging temperature was changed to 45° C. The results are shown in Table 2, FIGS. 2 and 4.

TABLE 2

| | Discharge capacity at the 100th cycle [Ah] | Capacity retention rate at the 100th cycle [%] |
|---|---|---|
| Example 11 | 1.941 | 92.7 |
| Comparative Example 3 | 1.934 | 91.9 |

| | Discharge capacity at the 400th cycle [Ah] | Capacity retention rate at the 400th cycle [%] |
|---|---|---|
| Example 14 | 1.787 | 85.5 |
| Example 16 | 1.694 | 81.2 |
| Example 17 | 1.731 | 82.6 |
| Comparative Example 3 | 1.583 | 75.2 |

Figure 2:
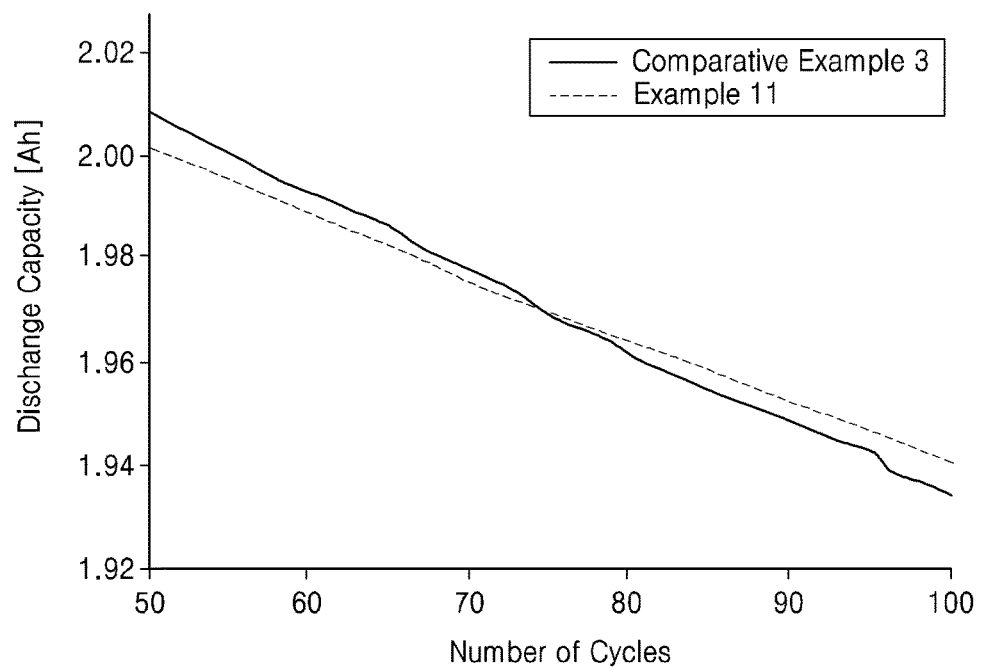
FIG. 2 is a graph illustrating discharge capacity at high temperature of lithium batteries prepared in Example 11 and Comparative Example 3.
Figure 4:
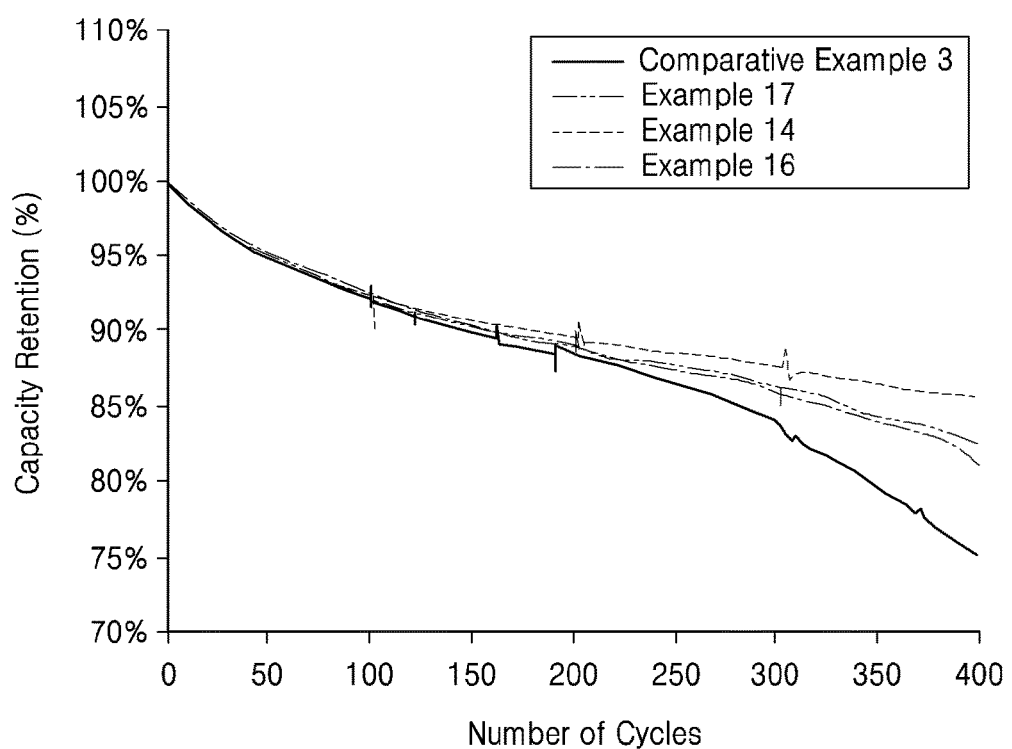
FIG. 4 is a graph illustrating capacity retention rate at high temperature of lithium batteries prepared in Examples 14, 16, and 17 and Comparative Example 3.

As shown in Table 2, FIGS. 2 and 4, the lithium batteries manufactured in Example 11, 14, 16, and 17, where two additives were added simultaneously, showed a considerable improvement in discharge capacity, lifetime characteristics, and thermal stability at high temperature compared to that manufactured in Comparative Example 3, where only a nitrile-based compound was used as an additive.

Evaluation Example 3

Evaluation of Change in Thickness of Lithium Batteries

Charging/discharging experiments were repeatedly performed up to the 500th cycle regarding the lithium batteries manufactured in Example 16, 18 to 20 and Comparative Example 3 in the same charging/discharging condition as in Evaluation Example 1. The thickness of the lithium batteries was measured at every 100 cycles and compared to observe the change in thickness as compared to the initial thickness of the lithium batteries, and the results are shown in FIGS. 5 and 6, respectively.

Figure 5:
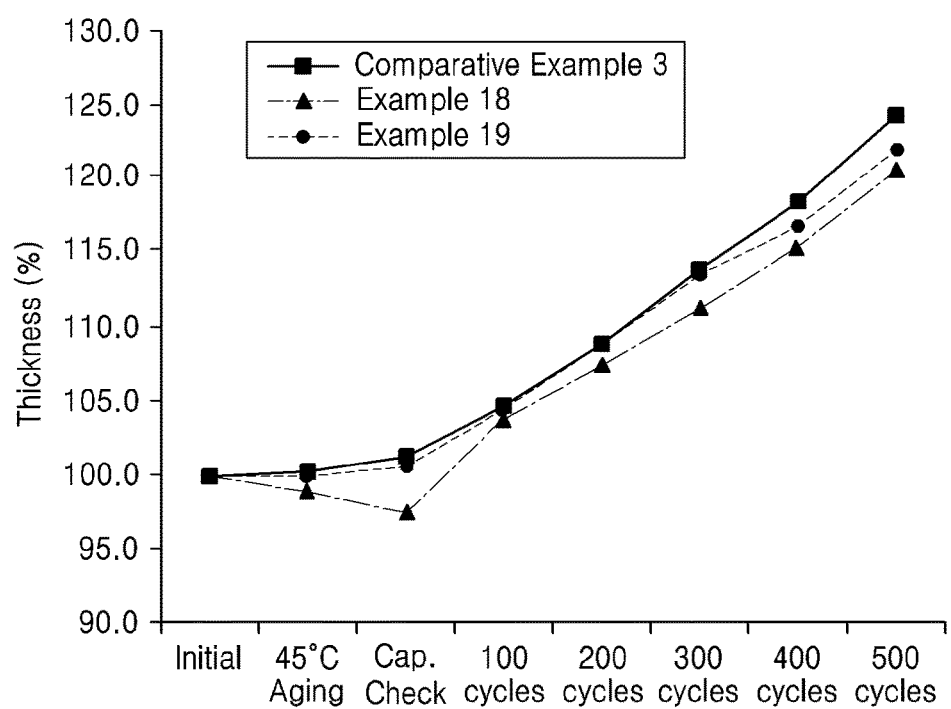
FIG. 5 is a graph illustrating the thickness change of lithium batteries prepared in Examples 18 and 19 and Comparative Example 3.
Figure 6:
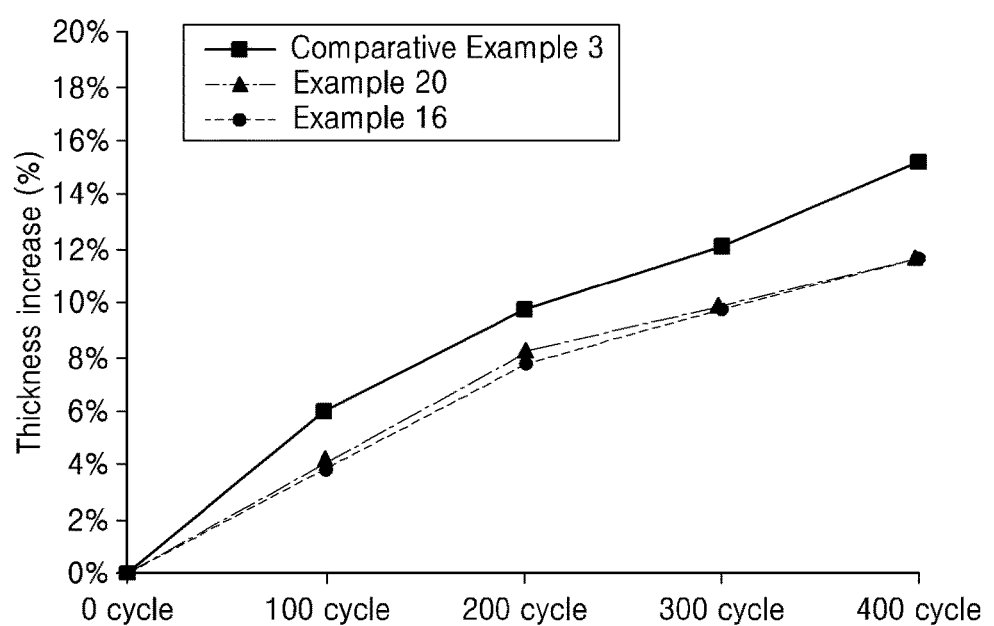
FIG. 6 is a graph illustrating the thickness change of lithium batteries prepared in Examples 16 and 20 and Comparative Example 3.

As shown in FIGS. 5 and 6, the lithium batteries manufactured using the organic electrolyte solution of the present disclosure showed a suppressed increase in a thickness of the lithium batteries due to a suppressed swelling as compared to the lithium battery where nitrile-based compound was used as an additive.

Evaluation Example 4

Evaluation of Oxidative Voltage

Figure 7:
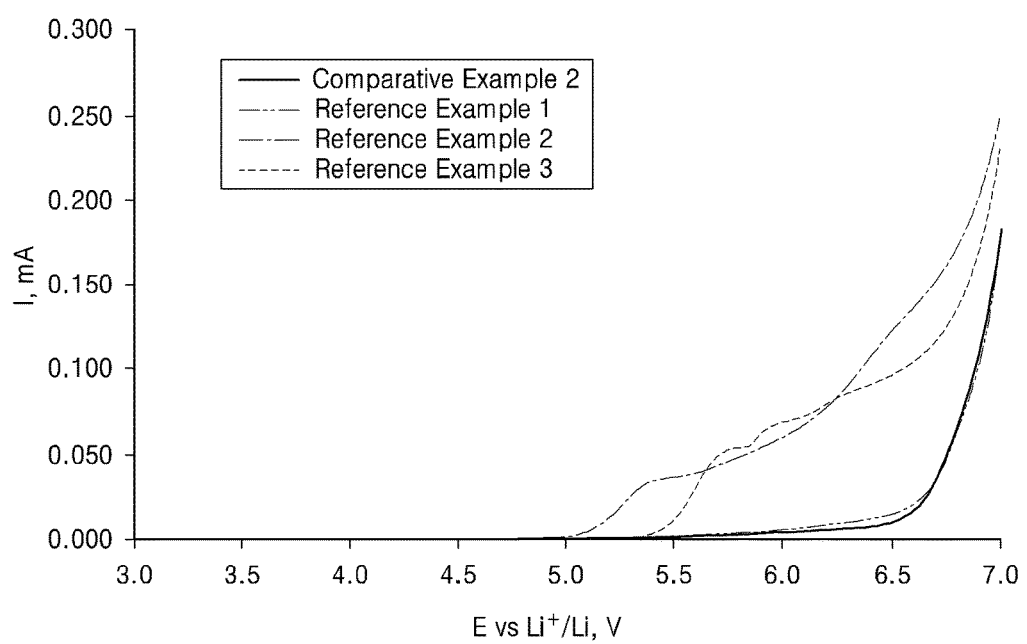
FIG. 7 is a graph showing the experimental results of a linear sweep voltammetry regarding the organic electrolyte solutions of lithium batteries prepared in Reference Examples 1 to 3 and Comparative Example 2.

With respect to organic electrolyte solutions prepared in Reference Examples 1 to 3 and Comparative Example 2, a change of current according to an increase in voltage were measured using a linear sweep voltammetry, and the results are shown in FIG. 7.

In the measurement, Pt electrodes were used as a working electrode and a counter electrode, and Li was used as a standard electrode.

As shown in FIG. 7, no oxidation occurred in any of the organic electrolyte solutions until they reached 5V (versus Li). The additives are suitable for lithium batteries having a voltage of 5.0V or less.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An organic electrolyte solution, comprising:
   a lithium salt;
   an organic solution;
   a thiophene-based compound, wherein the thiophene-based compound is

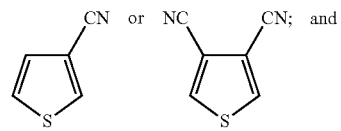 [SMILES: N#Cc1ccsc1 ; N#Cc1cscc1C#N]

a nitrile-based compound; wherein the nitrile-based compound is

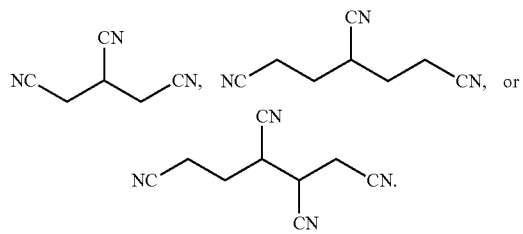

2. The organic electrolyte solution of claim 1, wherein the thiophene-based compound is present in an amount from about 0.001 to about 5 wt % based on total weight of the organic electrolyte solution.

3. The organic electrolyte solution of claim 1, wherein the nitrile-based compound is present in an amount from about 0.1 to about 10 wt % based on total weight of the organic electrolyte solution.

4. The organic electrolyte solution of claim 1, wherein the concentration of the lithium salt in the electrolyte is from about 0.01 to about 2.0M.

5. The organic electrolyte solution of claim 1, wherein the organic solution comprises a low viscosity solvent.

6. The organic electrolyte solution of claim 1, wherein the organic solution is selected from dialkyl carbonate, cyclic carbonate, linear or cyclic ester, linear or cyclic amide, aliphatic nitrile, linear or cyclic ether, and derivatives thereof.

7. The organic electrolyte solution of claim 1, wherein the organic solution is selected from dimethyl carbonate (DMC), ethylmethyl carbonate (EMC), methylpropyl carbonate, ethylpropyl carbonate, diethyl carbonate (DEC), dipropyl carbonate, propylene carbonate (PC), ethylene carbonate (EC), fluoroethylene carbonate (FEC), butylene carbonate, ethyl propionate, ethyl butyrate, acetonitrile, succinonitrile (SN), dimethylsulfoxide, dimethylformamide, dimethylacetamide, γ-valerolactone, γ-butyrolactone, and tetrahydrofuran.

8. A lithium battery comprising an organic electrolyte solution according to claim 1.

* * * * *